United States Patent
Iyengar et al.

(10) Patent No.: US 10,929,246 B2
(45) Date of Patent: Feb. 23, 2021

(54) BACKUP CAPABILITY FOR OBJECT STORE USED AS PRIMARY STORAGE

(71) Applicant: International Business Machines Corporation, Armonk, NY (US)

(72) Inventors: Ranganath Gorur Krishna Iyengar, Bangalore (IN); Madhusudan K. Satyanarayana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 14/876,956

(22) Filed: Oct. 7, 2015

(65) Prior Publication Data

US 2017/0103000 A1     Apr. 13, 2017

(51) Int. Cl.
    *G06F 11/14*     (2006.01)
(52) U.S. Cl.
    CPC ...... *G06F 11/1464* (2013.01); *G06F 11/1451* (2013.01); *G06F 2201/80* (2013.01)
(58) Field of Classification Search
    CPC .................................................. G06F 11/1464
    See application file for complete search history.

(56) References Cited

U.S. PATENT DOCUMENTS

| 7,860,843 | B2  |   | 12/2010 | Dodd et al. |             |
|-----------|-----|---|---------|-------------|-------------|
| 7,996,371 | B1  | * | 8/2011  | Deshmukh    | G06F 16/1748 |
|           |     |   |         |             | 707/692     |
| 10,289,496| B1  | * | 5/2019  | Chopra      | G06F 11/1461 |
| 2007/0136381 | A1 | * | 6/2007 | Cannon     | G06F 11/1451 |
|           |     |   |         |             | 707/200     |
| 2010/0082553 | A1 | * | 4/2010 | Beatty     | G06F 11/1469 |
|           |     |   |         |             | 707/679     |
| 2010/0114828 | A1 | * | 5/2010 | Persson    | G06F 11/1451 |
|           |     |   |         |             | 707/640     |
| 2011/0126168 | A1 |   | 5/2011 | Ilyayev    |             |
| 2014/0059311 | A1 |   | 2/2014 | Oberhofer et al. |     |

(Continued)

FOREIGN PATENT DOCUMENTS

EP         2336886 A2     6/2011

OTHER PUBLICATIONS

SwiftStack, The OpenStack Object Storage System, 2012.*

(Continued)

*Primary Examiner* — Dawaune A Conyers
(74) *Attorney, Agent, or Firm* — Brown & Michaels, PC; Christopher Pignato

(57) ABSTRACT

A method computer program product and computer system for generating a backup of a primary object in an object store system. The object store system comprising: a proxy layer comprising: a plurality of proxy nodes; a backup module; and a ring; a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; and a backup database in communication with the backup module for storing associations between versions of backup copies of the primary objects, the primary copies of objects, the containers, and the at least one backup container.

12 Claims, 8 Drawing Sheets

(56) References Cited

U.S. PATENT DOCUMENTS

| | | | |
|---|---|---|---|
| 2014/0108474 A1* | 4/2014 | David | G06F 3/0611 707/827 |
| 2014/0282615 A1 | 9/2014 | Cavage et al. | |
| 2014/0372384 A1* | 12/2014 | Long | G06F 17/30289 707/679 |
| 2016/0218936 A1* | 7/2016 | Shehter | H04L 67/1044 |

OTHER PUBLICATIONS

Mukherjee, "Benchmarking Hadoop performance on different distributed storage systems", Jun. 2015 (Year: 2015).*

Leyden, T. "A Beginner's Guide to Next Generation Object Storage" DDN Whitepaper, 2013.

* cited by examiner

BACKUP CAPABILITY FOR OBJECT STORE USED AS PRIMARY STORAGE

BACKGROUND

The present invention relates to object store system, and more specifically to backup capability for objects within the object store system, when the object store is used as primary storage. The term primary storage is defined as any component that can store nonvolatile data and is the main storage for the system and accessible by a computer.

Object store is a storage technology which stores unstructured data in the form of binary streams, where each binary stream is referred to by a unique key. The data in an object store does not store the data in a file and directory structure. Typically an object store keeps multiple copies of data on multiple servers to protect against failure of components. Examples of systems that use object store are IBM's Softlayer® object store, Atmos® of EMC Corporation and Openstack Swift an open source project.

Currently, when an object store is used a primary storage (e.g. as a file server or block storage using gateways) the data of the object store is backed up by copying the data of object store to secondary storage, such as tape drives or other media. The copying is initiated by backup software or other backup tools. Some of the problems associated with backing up the object store through copying of the data to secondary storage is the requirement of specific backup software and hardware and skilled users to maintain and manage the backup infrastructure. Furthermore, the data recovery process from the backup is complex and requires skilled users, the integration of the backup software, the primary storage and the secondary storage.

Other solutions used to backup data of an object store used as a primary store is to take a snapshot of the data, which represents a copy of a state of the data of the system at a particular point in time. Snapshot backup may be used with network attached storage (NAS) and storage area network (SAN) based storage systems. However, snapshot backup cannot be applied to back up the object store as the storage of the data is in a format that is not supported by object store, since the object store keeps the data at an abstraction layer to track objects above the core file systems/block storage techniques and hence object stores do not have visibility to control the blocks of data that make the object. Because of this, object stores cannot apply the block based backup techniques such as snapshots which are used by NAS and SAN.

SUMMARY

According to one embodiment of the present invention, a method for generating a backup of a primary object in an object store system is disclosed. The object store system comprises: a proxy layer comprising: a plurality of proxy nodes; a backup module; and a ring; a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; and a backup database in communication with the backup module for storing associations between versions of backup copies of the primary objects, the primary copies of objects, the containers, and the at least one backup container. The method comprising the steps of the backup module: receiving an indication that a primary object is marked for backup; retrieving a copy of the primary object from the container in which it is stored; creating a record in the backup database; identifying the container and the primary object with an identification of the backup container and the versions of the backup copy of the primary object, and storing a backup copy of a version of the primary object in the backup container.

According to another embodiment of the present invention, a computer program product for generating a backup of a primary object in an object store system is disclosed. The object store system comprising: a proxy layer comprising: a plurality of proxy nodes; a backup module; and a ring; a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; and a backup database in communication with the backup module for storing associations between versions of backup copies of the primary objects, the primary copies of objects, the containers, and the at least one backup container; the proxy nodes and the storage nodes each having at least a computer comprising at least one processor, one or more memories, one or more computer readable storage media. The computer program product comprising a computer readable storage medium having program instructions embodied therewith, the program instructions executable by the computer to perform a method comprising: receiving, by the backup module, an indication that a primary object is marked for backup; retrieving, by the backup module, a copy of the primary object from the container in which it is stored; creating, by the backup module, a record in the backup database; identifying, by the backup module, the container and the primary object with an identification of the backup container and the versions of the backup copy of the primary object, and storing, by the backup module, a backup copy of a version of the primary object in the backup container.

According to another embodiment of the present invention, a computer system for generating a backup of a primary object in an object store system is disclosed. The object store system comprising: a proxy layer comprising: a plurality of proxy nodes; a backup module; and a ring; a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; and a backup database in communication with the backup module for storing associations between versions of backup copies of the primary objects, the primary copies of objects, the containers, and the at least one backup container; the proxy nodes and the storage nodes each having at least one processor, one or more memories, and one or more computer readable storage media having program instructions executable by the computer. The program instructions comprising: receiving, by the backup module, an indication that a primary object is marked for backup; retrieving, by the backup module, a copy of the primary object from the container in which it is stored; creating, by the backup module, a record in the backup database; identifying, by the backup module, the container and the primary object with an identification of the backup container and the versions of the backup copy of the primary object, and storing, by the backup module, a backup copy of a version of the primary object in the backup container.

DETAILED DESCRIPTION

Figure 1:
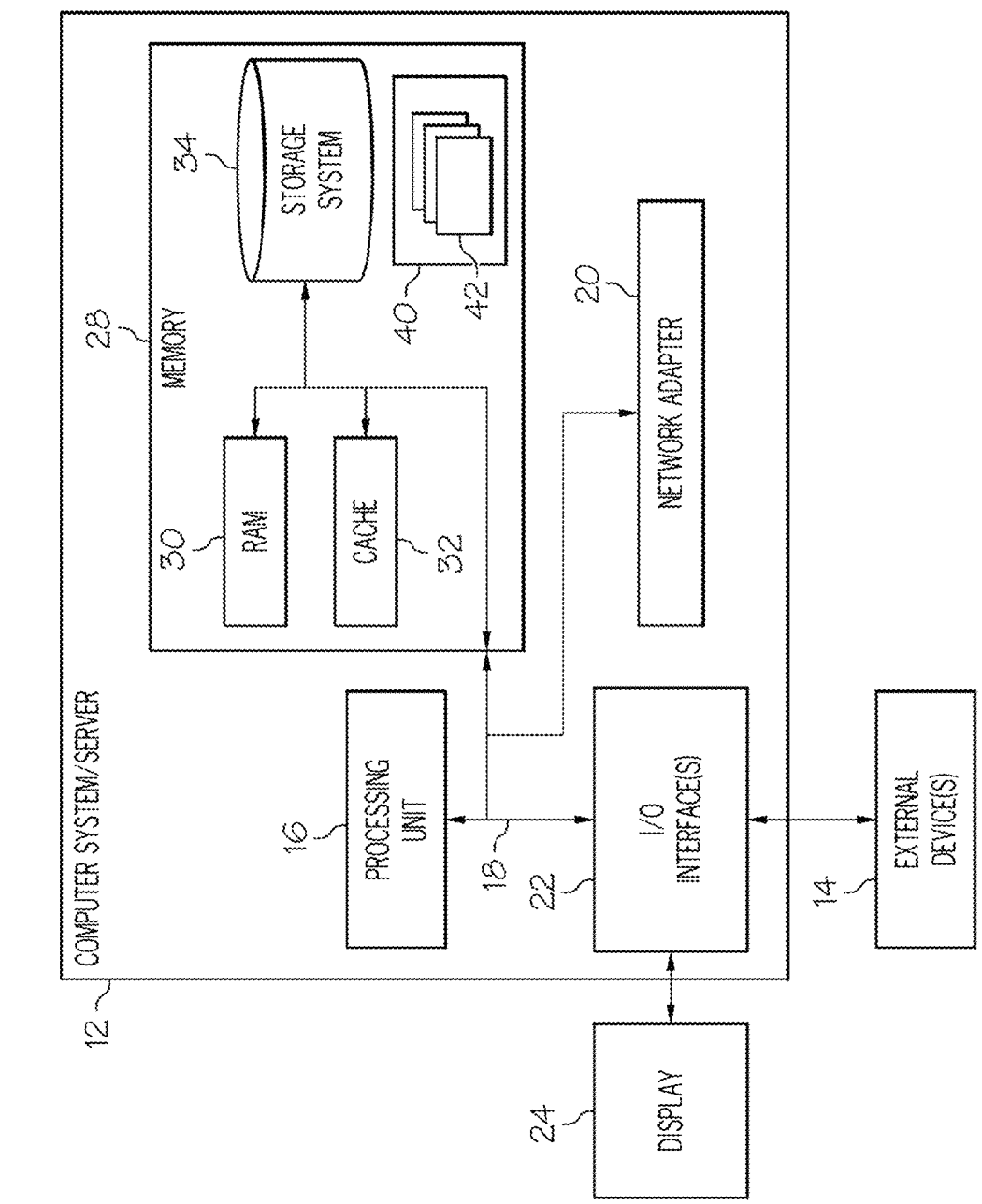
FIG. 1 depicts a cloud computing node according to an embodiment of the present invention.

In an embodiment of the present invention, it will be recognized that n copies of a file are stored as objects in a container and an n+1 copy and any associated versions are stored in a backup container, where n is an integer. When backup is initiated, a new version of the n+1 copy is created in the backup container. If the number of versions of an object backed up in the backup container exceeds a determined number in a backup retention policy, the oldest version of the object is deleted in FIFO order.

In an embodiment of the present invention the client and/or administrator, through an interface with the proxy layer, can enable backup of files/objects, configure a backup schedule and retention policy, view versions of the backed up objects, and restore a version of the backup copy as a primary copy.

In an illustrative embodiment of the present invention, characteristics of a workload of a virtual machine may include, the creation time of a workload, the workload category, the manually change of, the status of the workload (active, suspended), the timestamps or other such activity of the workload, and the deletion of the workload. The timestamps may relate to the time frame in which the workload has been active for. The timestamp may be compared to a predetermined range of time.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

It will be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
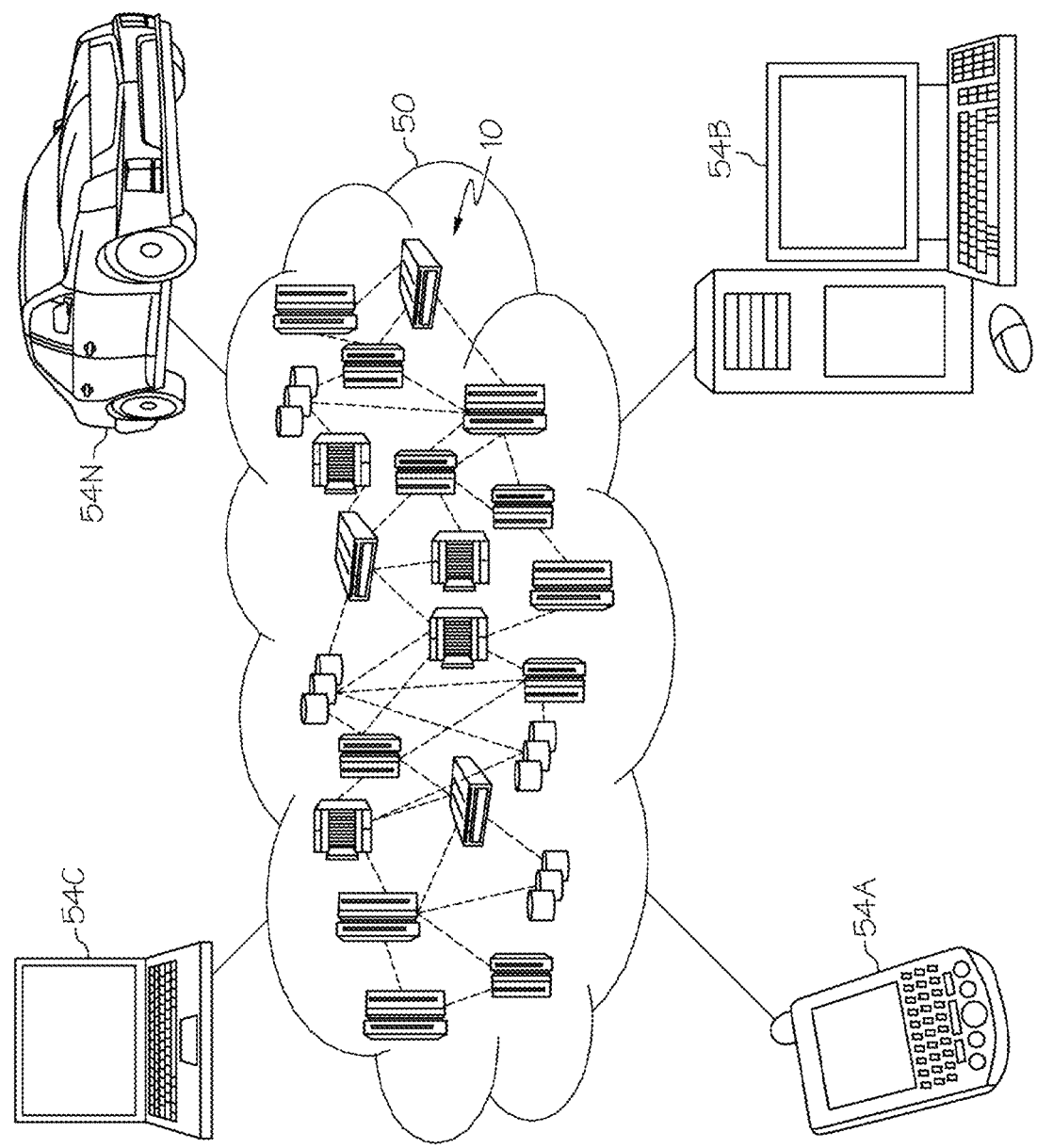
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
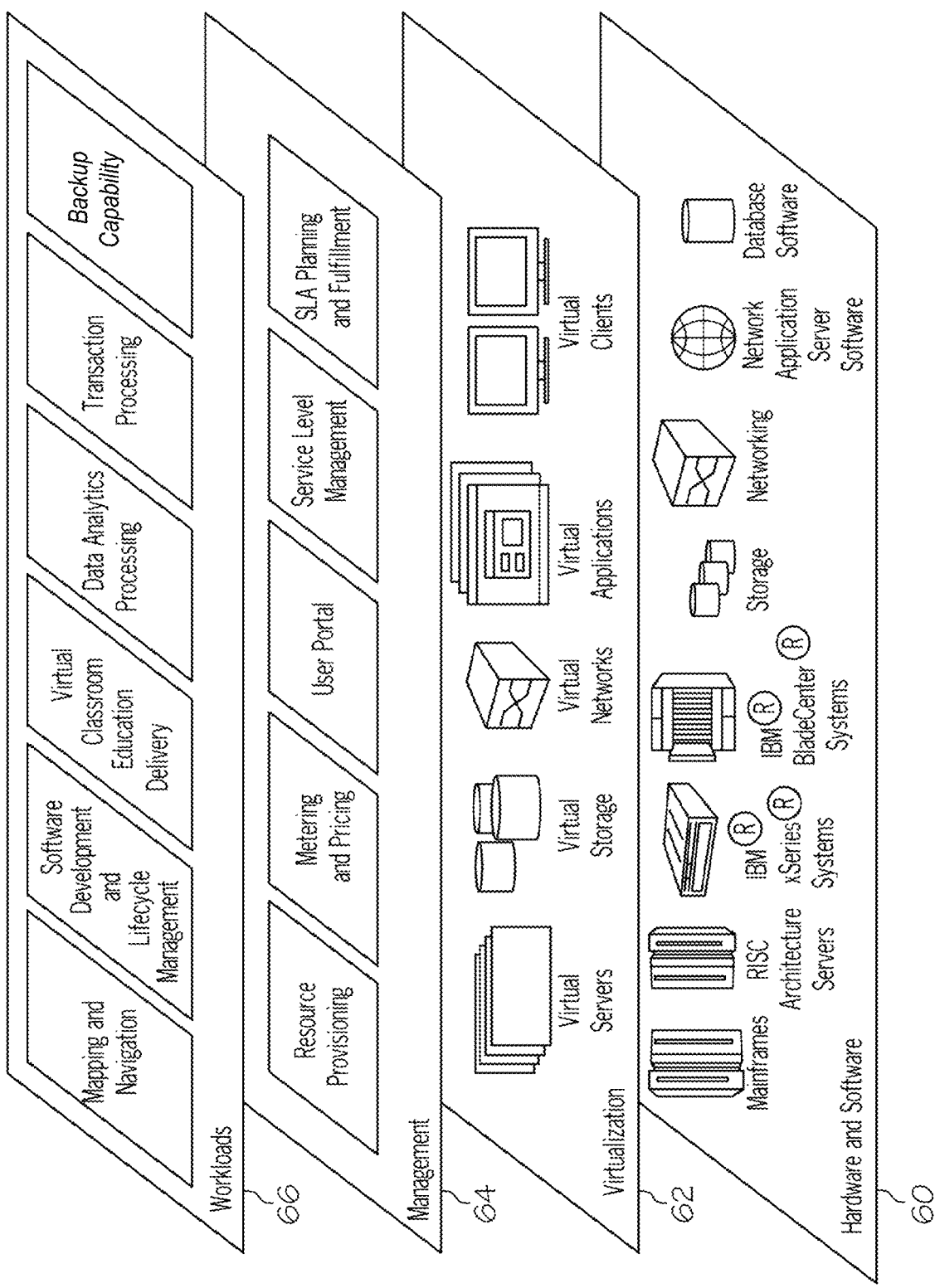
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and backup capability.

Figure 4:
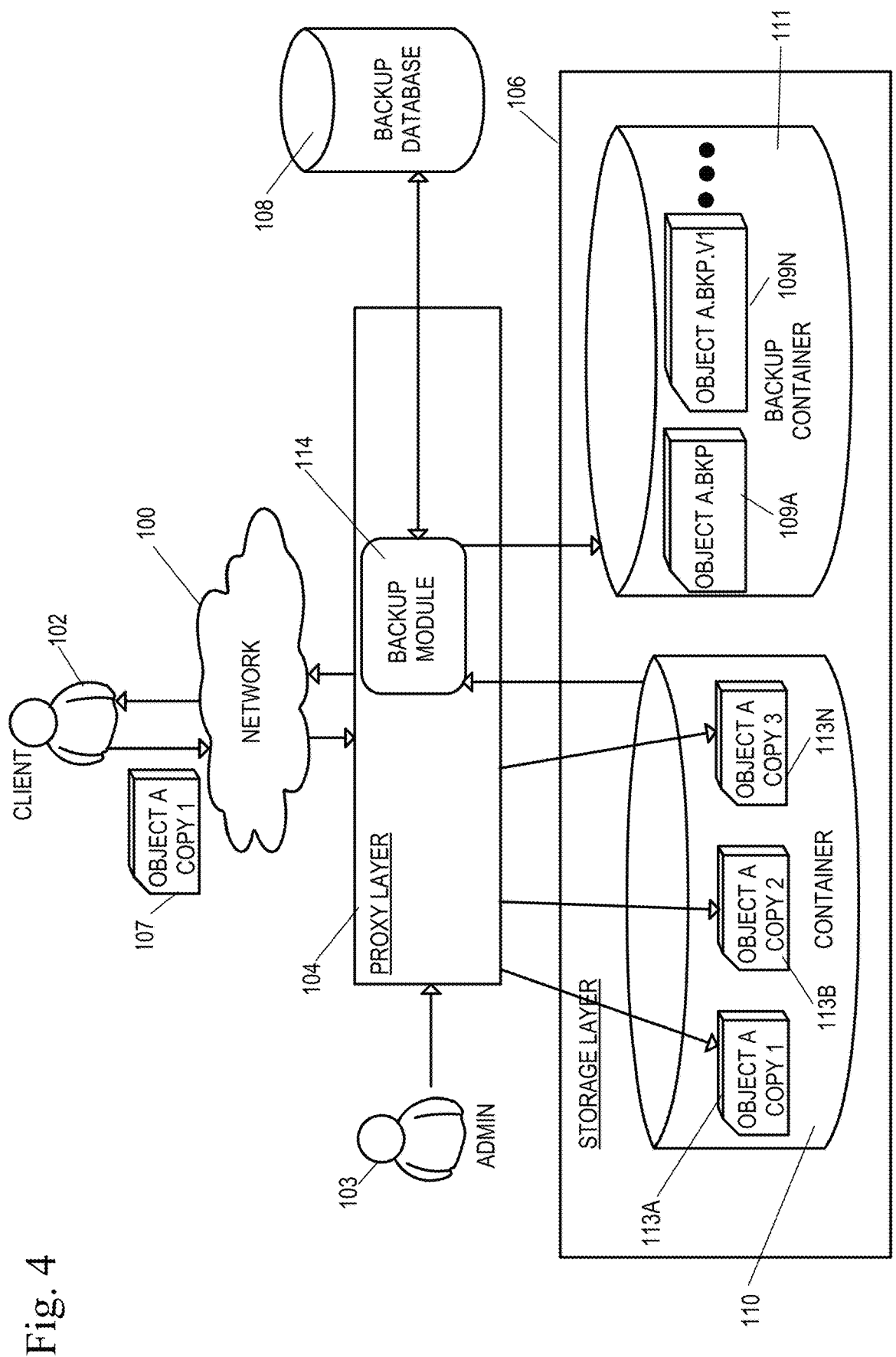
FIG. 4 shows a schematic of a cloud computing environment which provides an Infrastructure as a Service (IaaS).
Figure 7:
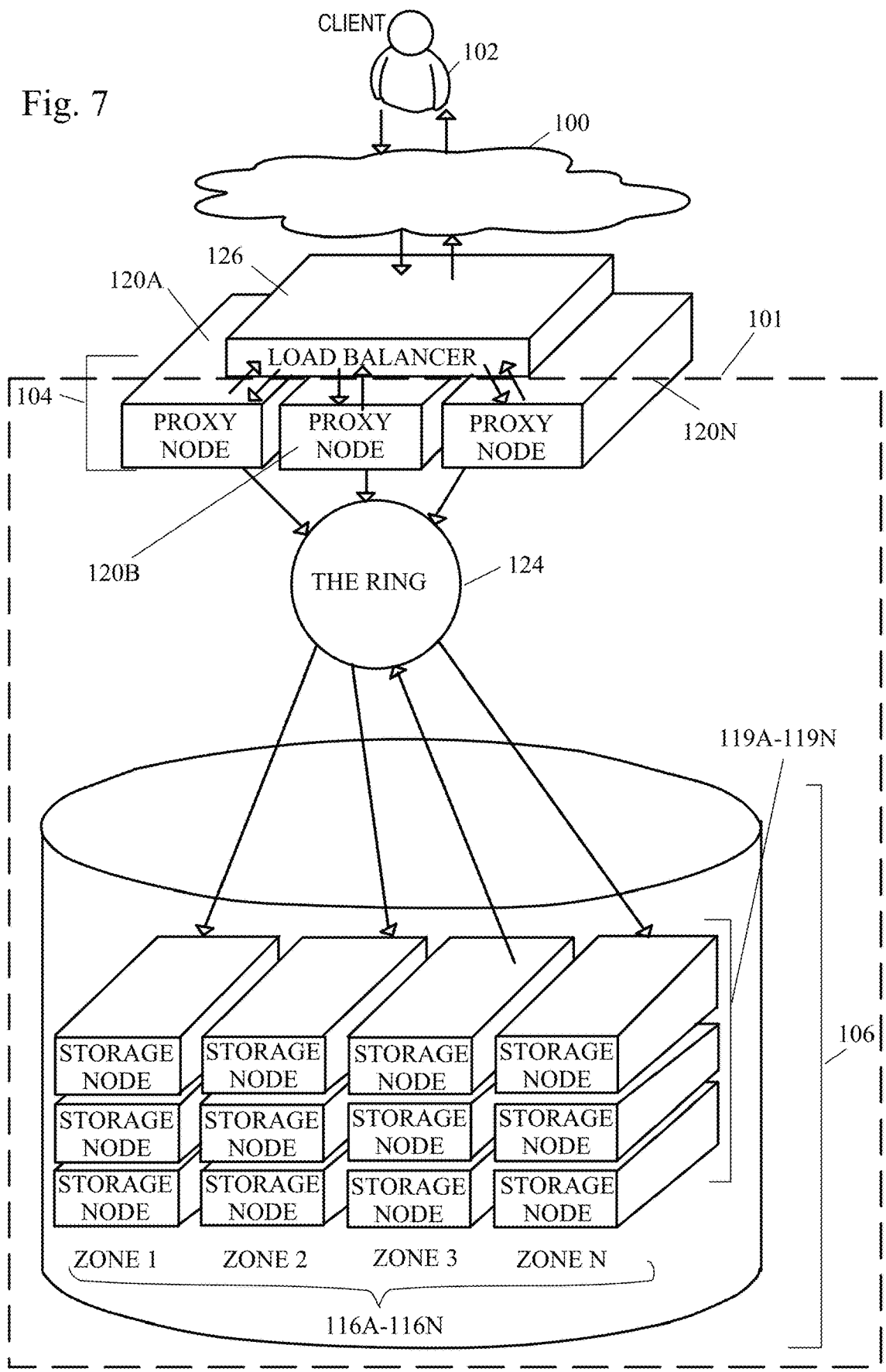
FIG. 7 shows a schematic of the storage nodes and proxy nodes of the open store system of the cloud computing environment.
Figure 8:
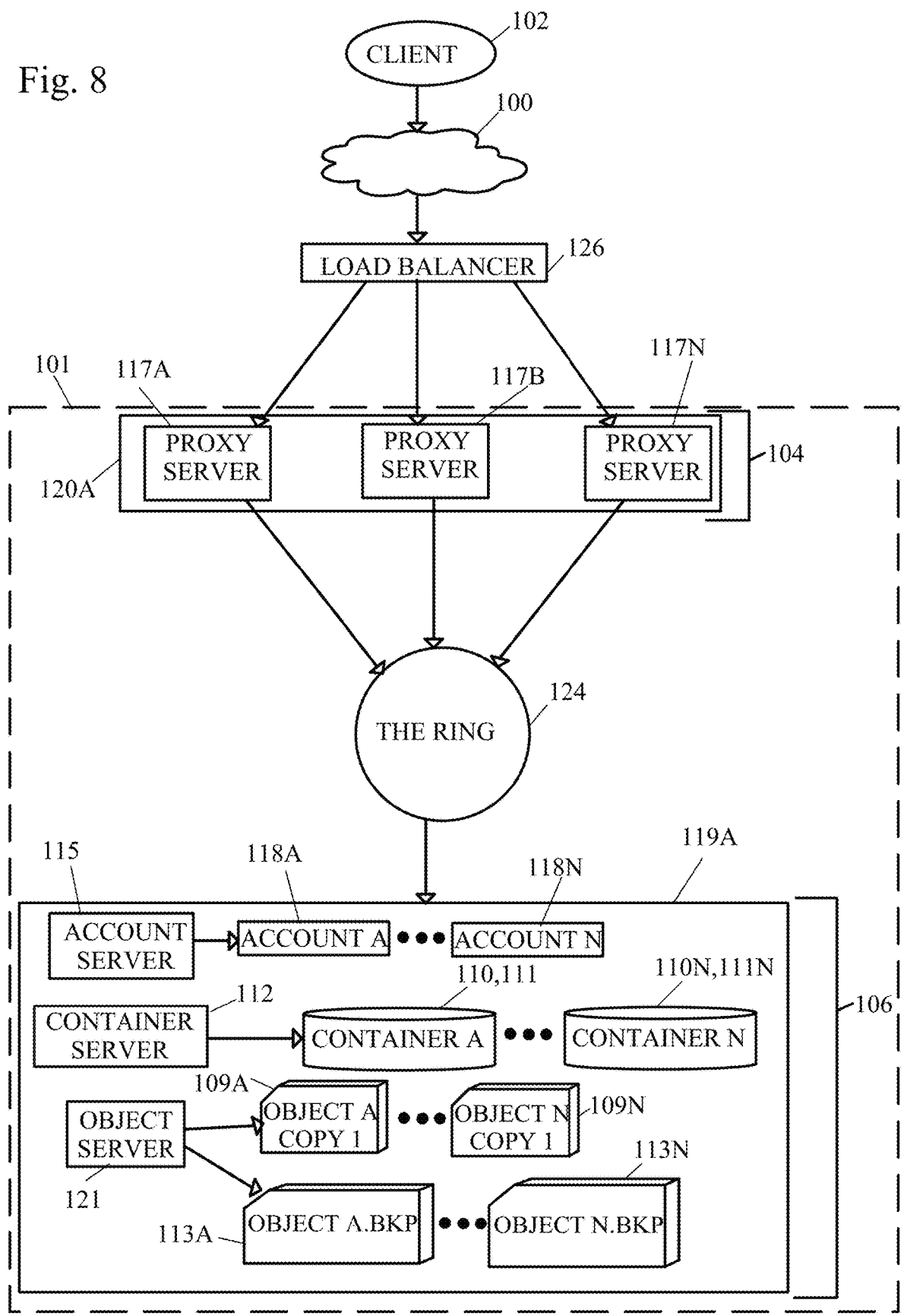
FIG. 8 shows a schematic of a cluster of the open store system of the cloud computing environment.

FIGS. 4, 7, and 8 show schematics of a possible architecture of a cloud computing environment which shows an arrangement of computing nodes which provides an Infrastructure as a Service (IaaS).

Referring to FIGS. 7-8, the architecture provides an open storage system or object store system using clusters 101 of nodes capable of storing data. It should be noted that while one cluster is shown, multiple clusters are present. Each cluster 101 includes a proxy layer 104 and a storage layer 106.

The proxy layer 104 includes a plurality of proxy nodes 120a-120n which may include at least one proxy server 117a-117n. The proxy nodes 120a-120n accept requests to save, backup, delete, or retrieve a file 107 from users or clients 102 through a network 100 using application program interface (API) requests. The proxy nodes 120a-120n coordinates the requests with the appropriate storage nodes 119a-119n in the storage layer 106 through a ring 124. The requests are load-balanced across all proxy nodes 120a-120n, for example through a load balancer 126.

For each request received from the client 102, a proxy server 117a-117n of a proxy node 120a-120n will look up the location of the account 118, container 110,111 or object 109, 113 in the ring 124 and route the request accordingly. The ring 124 represents a mapping between the names of entities stored and their physical locations. There are separate rings for accounts 118, containers 110,111 and objects 109, 113. The ring 124 maintains the mapping through zones, partitions, devices and replicas. Each partition in the ring 124 is replicated three times across the cluster 101 by default.

The proxy layer 104 also contains a backup module 114. The backup module 114 interacts with the object store system and is present in the proxy servers 117a-117n.

The backup module 114 is in communication with a backup database 108. The backup database 108 is preferably part of the backup module 114. It should be noted that the information in the backup database 108 is preferably synchronized across all of the proxy nodes 120a-120n. The backup database 108 may be a flat file, object within the object store system, a non SQL" or "non relational" database, or some other type of file.

The backup module 114 also communicates with containers 110, 111, objects 109, 113 and accounts 118. The backup module 114 maintains the backup database 108 with points to object identification, such as container identification, backup identification, backup container identification, backup version identification, and association between the backup and primary copies. The backup module 114 also performs backups by copying the object from the primary copies 113a-113n located within a container 110 into a backup container 111 located in storage layer 106 based on a backup schedule and applicable backup retention policy.

The backup module 114 receives requests from a client 102 or administrator 103, via delivery through the proxy servers 117a-117n and acts with the object store system to create version enabled containers, for example the a backup container 111, read and write objects from other containers, for example containers 110 into the version enabled container 111.

Within the storage layer 106 are a plurality of storage nodes 119a-119n which may be further partitioned or grouped into zones 116a-116n. The zones 116a-116n are used to isolate failures that may occur. For example, if a storage node were to fail, data is automatically distributed to other zones to ensure that there are three primary copies of an object available. The client 102 does not interact directly with the storage layer 106.

Each of the storage nodes 119a-119n has an account server 115 which provides access to groups of accounts 118a-118n. The accounts 118a-118n are groups of containers 110, 111. A container server 112a-112n is also present within each storage node 119a-119n and provides access to groups of containers 110a-110n and 111a-111n. The containers 110a-110n, 111a-111n including groups of objects 113a-113n and 109a-109n. An object server 121 is also present within each of the storage nodes and provides access to groups of objects 113a-113n and 109a-109n, which are key-value entries in the object store or the data itself being stored.

An administrator 103 may have access to the proxy layer 104 and the storage layer 106 to initiate creation of containers 220 and backup container 111 with versioning enabled. Versioning allows multiple versions of the same object to be stored. It should be noted that preferably only one copy of the backed up data exists, but in multiple versions. The administrator 103 may also set or alter the backup schedule and the backup retention policy, which may limit the number of versions of the backup copy being stored.

While in FIGS. 4, 7, and 8 only one container 110, backup container 111, and backup database 108 may be shown it is understood that a plurality of containers, backup containers and backup databases may be present within the scope of the invention.

During a normal write of a file 107, the client 102 sends a request to the proxy layer 104. Through the ring 124, the file 107 is stored as a primary object 113 in a specific container 110 and written three times within the container 110—see object A copy 1, object A copy 2, object A copy 3. Each object in the container 110 has a unique key. The unique key is the same for all three or more copies of the same object. The unique key may be used as an identification which can be used by the client 102 to perform read, write or update operations on the primary object. In case a copy of the object is not available due to failure of the node, or disk, etc. . . . , the proxy layer automatically reads the object from another copy.

Figure 5:
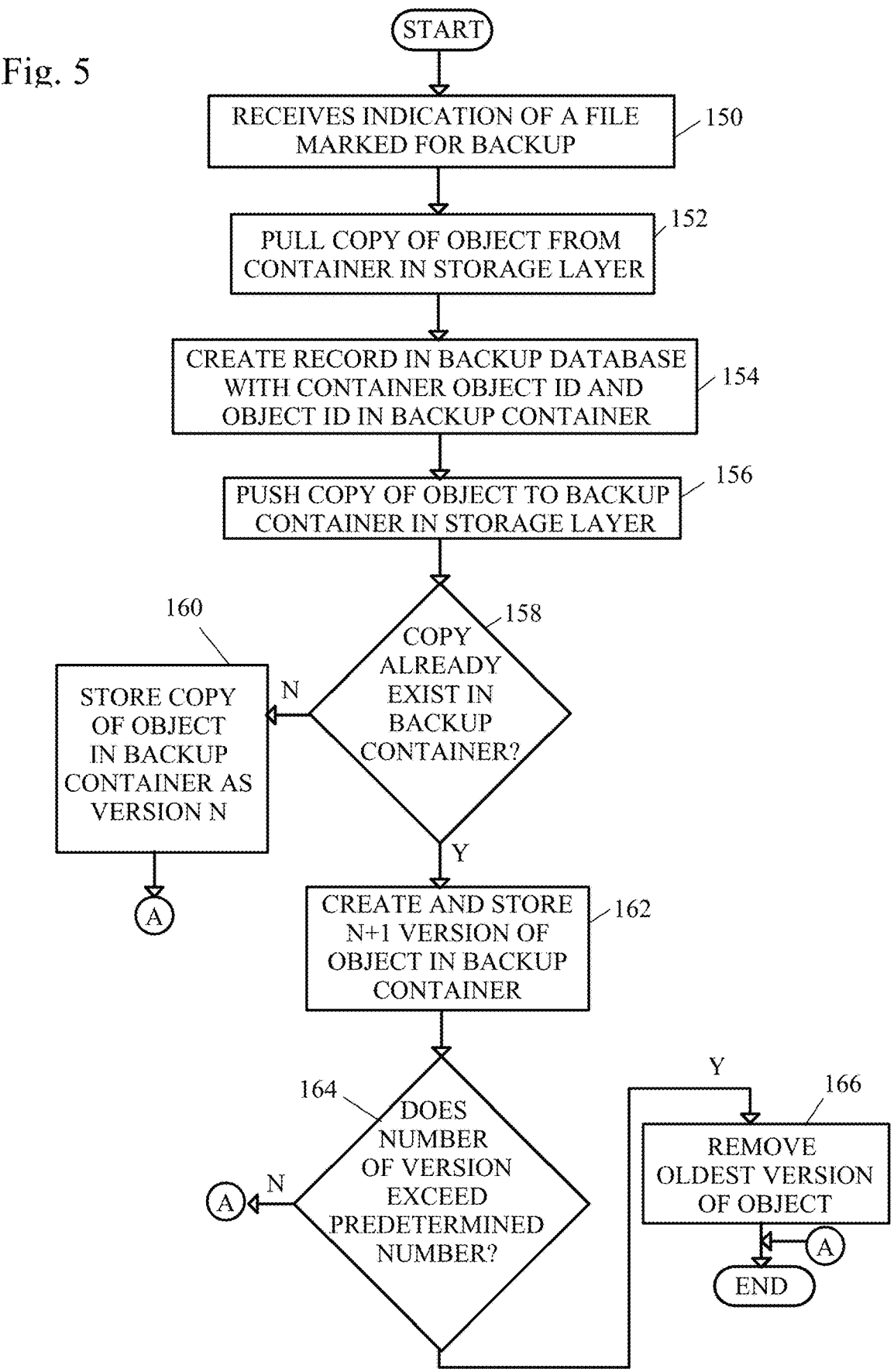
FIG. 5 shows a method for generating a backup of an object of an object store.

FIG. 5 shows a method for generating a backup of a primary object in an object store. In a first step, the backup module receives an indication of a file marked for backup from the client (step 150). This request is preferably received through an application programming interface with the proxy layer 104. From the request, a container ID in which the primary object is stored is determined, as well as a backup container ID in which backups of the primary objects corresponding to the specific container are stored.

It should be noted that the indication of a file marked for backup need not come from a client 102, and may instead be part of a routine backup schedule or policy which is automated or run periodically by an administrator 103.

The backup module pulls a copy of the primary object 113 representing the file 107 from the container 110 in the storage layer 106 (step 152). A Hypertext Transfer Protocol (HTTP) GET request may be used to pull the copy of the primary object which needs to be backed up.

The backup module creates a record in the backup database with the container ID or key and the object ID or key in the identified backup container (step 154). Table 1 below shows an example of some of the entries in the backup database. It should be noted that other versions may be present in the backup container depending on the backup retention policy. It should also be noted that OID A' is different than OID A. OID A' is unique across all versions. This applies to all entries in the backup database.

TABLE 1

| Object ID in Original Container | Backup Reference in Backup Container |
| --- | --- |
| <Container ID1>/Unique OID A> | <Bkp Container ID>/<OID A' of Object.bkp> |
| | <Bkp Container ID>/<OID A' of Object.bkp.v1> |
| <ContainerID1>/<Unique OID B> | <Bkp Container ID>/<OID B' of Object.bkp> |
| | <Bkp Container ID>/<OID B' of Object.bkp.v1> |
| . . . | . . . |

A backup copy of the primary object representing the file is pushed or copied to the backup container in the storage layer (step 156).

If a backup copy of the primary object does not already exist in the backup container (step 158), a backup copy of the primary object is stored in the backup container as version n, where n is any integer (step 160). For example, a backup of the primary object A would be <object A.bkp>.

If a backup copy of the primary object already exists in the backup container (step 158), a backup version (n+1) of the primary object is created and stored in the backup container (step 162). For example, if <objectB.bkp> exists in the backup container, a n+1 version is created, <objectB.bkp.v1>.

If the number of versions exceeds a predetermined number as set in the backup retention policy (step 164), the oldest backup version of the primary object is discarded (step 166) and the method ends. If the number of versions does not exceed a predetermined number as set in the backup retention policy (step 164), the method ends.

Figure 6:
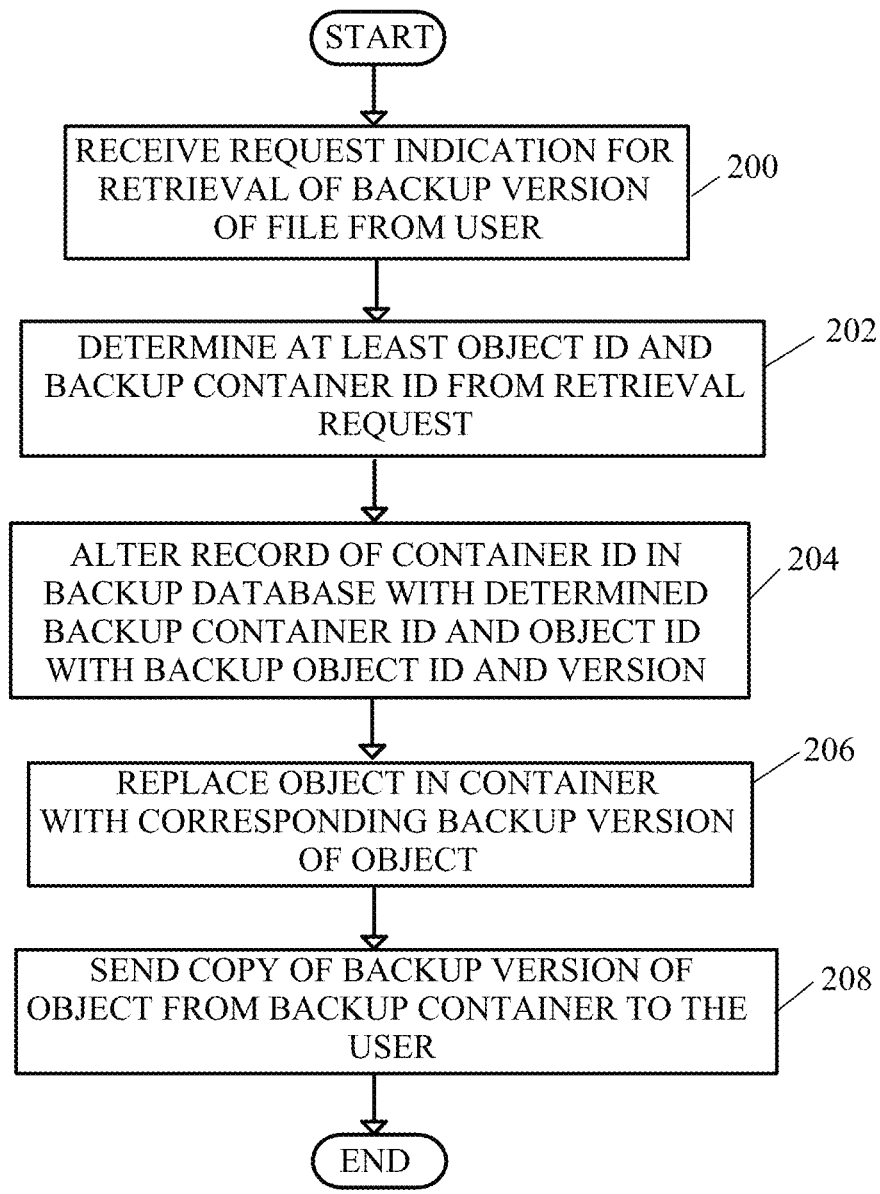
FIG. 6 shows a method for retrieving a backup of an object.

FIG. 6 shows a method for retrieving a backup of a primary object.

In a first step (step 200), the backup module receives a request indicating a retrieval of a backup version of a file from a client. This request is preferably received through an application programming interface with the proxy layer 104.

The backup module in the proxy layer determines at least an object identification or backup container identification from the retrieval request (step 202). For example, the client may send an HTTP GET request with the object ID as the parameter and an extension of ".bkp.vn", where the "bkp" denotes the backup and the "vn" denotes the version of the backup file or date of the backup. From this information, the backup container ID may be determined.

For example, if object A as shown in Table 1 above was marked for backup by a client 102 through a request and the administrator 103 set the backup policy to be: backup once daily and a 3 day retention policy, the policy would result in having three version of object A in the backup container. Object A.bkp would be the current day's copy, object-A.bkp.v1 would be the prior day's copy and objectA.bkp.v2 would be the copy of the object from two days prior. Other denotations to indicate that an object is a version may also be used and is not limited to the ".bkp.vn" described.

The client 103 may access any of the versions of object A or the original copy of object A by requesting the object with a .bkp.vn extension.

The backup module alters the record of container ID in the backup database with the determined backup container ID and the object ID container in the backup database with backup object ID and extension or version (step 204).

The backup module replaces the primary object in the container with backup version of the primary object (step 206) and the method ends.

The backup module sends a copy of the backup version of the primary object from the backup container to the client (step 208) and the method ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method for generating a backup of a primary object in an object store system, the object store system comprising:
  a cluster of nodes, each cluster comprising:
    a) a proxy layer comprising: a plurality of proxy nodes; a backup module; a backup database, and a ring, the ring representing a mapping between names of objects stored and physical locations of the objects; and
    b) a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container;
  the backup database in communication with the backup module for storing associations between versions of backup copies of the primary objects, primary copies of objects, the containers, and the at least one backup container, the backup database synchronized across all of the plurality of proxy nodes;
  the method comprising the steps of:
    the plurality of proxy nodes of the proxy layer receiving an indication that a primary object is marked for backup;
    the plurality of proxy nodes determining location of the primary object marked for backup within the ring of the proxy layer;
    the backup module of the proxy layer retrieving a copy of the primary object from a container in the storage layer in which it is stored;
    the backup module creating a record in the backup database in the proxy layer identifying the container and the primary object with an identification of the backup container and the versions of the backup copies of the primary object, and
    the backup module storing a version of a backup copy of the primary object in the backup container in the storage layer by determining whether the backup copy of the primary object is already present in the backup container; and if the backup copy of the primary object is already present in the backup container, creating and storing the backup copy of a new version of the primary object in the backup container, wherein if a number of the backup copy of the version of the primary object in the backup container exceeds a predetermined number, the backup module removing the backup copy of the version of the primary object which is oldest from the backup container.

2. The method of claim 1, wherein the record in the backup database comprises: container identification, backup object identification, corresponding object identification, and backup container identification.

3. The method of claim 1, wherein the backup copy of the version of the primary object from the backup container is retrieved by the backup module by the steps of:
  receiving a request for a version of the primary object from the backup container by a client;
  determining the primary object and backup container in which the backup copy of the version of the primary object requested is stored;
  altering the record in the backup database, such that the identification of the container is replaced with an identification of the determined backup container and a version of the determined primary object is replaced with the version of the backup copy of the primary object;
  replacing the primary object in the container with the determined primary object; and
  sending the backup copy of the version of the primary object requested to the client.

4. A computer program product for generating a backup of a primary object in an object store system, the object store system comprising: a cluster of nodes, each cluster comprising a) a proxy layer comprising: a plurality of proxy nodes; a backup module; a backup database; and a ring, the ring presenting a mapping between names of objects stored and physical locations of the objects; and b) a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; the backup database in communication with the backup module for storing associations between versions of backup copies of the primary objects, primary copies of objects, the containers, and the at least one backup container, the backup database synchronized across all of the plurality of proxy nodes; the proxy nodes and the storage nodes each having at least a computer comprising at least one processor, one or more memories, one or more computer readable storage media, the computer program product comprising a computer readable storage medium having program instructions embodied therewith, the program instructions executable by the computer to perform a method comprising:
  receiving, by the plurality of proxy nodes of the proxy layer, an indication that a primary object is marked for backup;
  determining, by the plurality of proxy nodes of the proxy layer, the location of the primary object marked for backup within the ring of the proxy layer;
  retrieving, by the backup module of the proxy layer, a copy of the primary object from a container in which it is stored;
  creating, by the backup module of the proxy layer, a record in the backup database in the proxy layer identifying, by the backup module, the container and the primary object with an identification of the backup container and the versions of the backup copies of the primary object, and
  storing, by the backup module of the proxy layer, a version of a backup copy of the primary object in the backup container in the storage layer by determining whether the backup copy of the primary object is already present in the backup container; and if the backup copy of the primary object is already present in the backup container, creating and storing the backup copy of a new version of the primary object in the backup container, wherein if a number of the backup copy of the version of the primary object in the backup container exceeds a predetermined number, the backup module removing the backup copy of the version of the primary object which is oldest from the backup container.

5. The computer program product of claim 4, wherein the record in the backup database comprises: container identification, backup object identification, corresponding object identification, and backup container identification.

6. The computer program product of claim 4, wherein the backup copy of the version of the primary object from the backup container is retrieved by the program instructions of:
   receiving, by the backup module, a request for a version of the primary object from the backup container by a client;
   determining, by the backup module, the primary object and backup container in which the backup copy of the version of the primary object requested is stored;
   altering, by the backup module, the record in the backup database, such that the identification of the container is replaced with an identification of the determined backup container and a version of the determined primary object is replaced with the version of the backup copy of the primary object;
   replacing, by the backup module, the primary object in the container with the determined primary object; and
   sending, by the backup module, the backup copy of the version of the primary object requested to the client.

7. The computer program product of claim 4, wherein software is provided as a service in a cloud environment.

8. A computer system for generating a backup of a primary object in an object store system, the object store system comprising: a cluster of nodes, each cluster comprising a) a proxy layer comprising: a plurality of proxy nodes; a backup module; a backup database; and a ring, the ring presenting a mapping between names of objects stored and physical locations of the objects; and b) a storage layer in communication with the plurality of proxy nodes and the backup module through the ring, the storage layer comprising a plurality of storage nodes, with each storage node having a plurality of servers for managing accounts, a plurality of containers, at least one backup container, and objects stored within the containers and the at least one backup container; and the backup database in communication with the backup module for storing associations between versions of backup copies of the primary objects, primary copies of objects, the containers, and the at least one backup container, the backup database synchronized across all of the plurality of proxy nodes; the proxy nodes and the storage nodes each having at least one processor, one or more memories, and one or more computer readable storage media having program instructions executable by the computer to perform the program instructions comprising:
   receiving, by the plurality of proxy nodes of the proxy layer, an indication that a primary object is marked for backup;
   determining, by the plurality of proxy nodes of the proxy layer, the location of the primary object marked for backup within the ring of the proxy layer;
   retrieving, by the backup module of the proxy layer, a copy of the primary object from a container in which it is stored;
   creating, by the backup module of the proxy layer, a record in the backup database in the proxy layer identifying, by the backup module, the container and the primary object with an identification of the backup container and the versions of the backup copies of the primary object, and
   storing, by the backup module of the proxy layer, a version of a backup copy of the primary object in the backup container in the storage layer by determining whether the backup copy of the primary object is already present in the backup container; and if the backup copy of the primary object is already present in the backup container, creating and storing the backup copy of a new version of the primary object in the backup container, wherein if a number of the backup copy of the version of the primary object in the backup container exceeds a predetermined number, the backup module removing the backup copy of the version of the primary object which is oldest from the backup container.

9. The computer system of claim 8, wherein the record in the backup database comprises: container identification, backup object identification, corresponding object identification, and backup container identification.

10. The computer system of claim 8, wherein the backup copy of the version of the primary object from the backup container is retrieved by the backup module by the program instructions of:
   receiving, by the backup module, a request for a version of the primary object from the backup container by a client;
   determining, by the backup module, the primary object and backup container in which the backup copy of the version of the primary object requested is stored;
   altering, by the backup module, the record in the backup database, such that the identification of the container is replaced with an identification of the determined backup container and a version of the determined primary object is replaced with the version of the backup copy of the primary object;
   replacing, by the backup module, the primary object in the container with the determined primary object; and
   sending, by the backup module, the backup copy of the version of the primary object requested to the client.

11. The computer system of claim 8, wherein software is provided as a service in a cloud environment.

12. The computer system of claim 8, wherein the backup database is a flat file, object within an object store system, a non-relational database, or non-structured query language database.

* * * * *